Sept. 9, 1924.   1,508,021
E. E. LAKSO
DOUBLE FAUCET
Filed Jan. 2, 1923   2 Sheets-Sheet 1
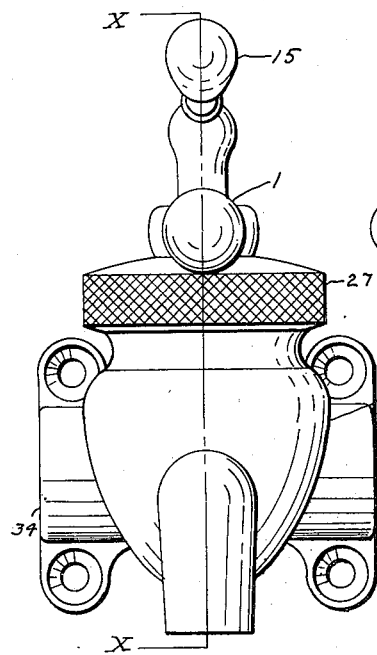
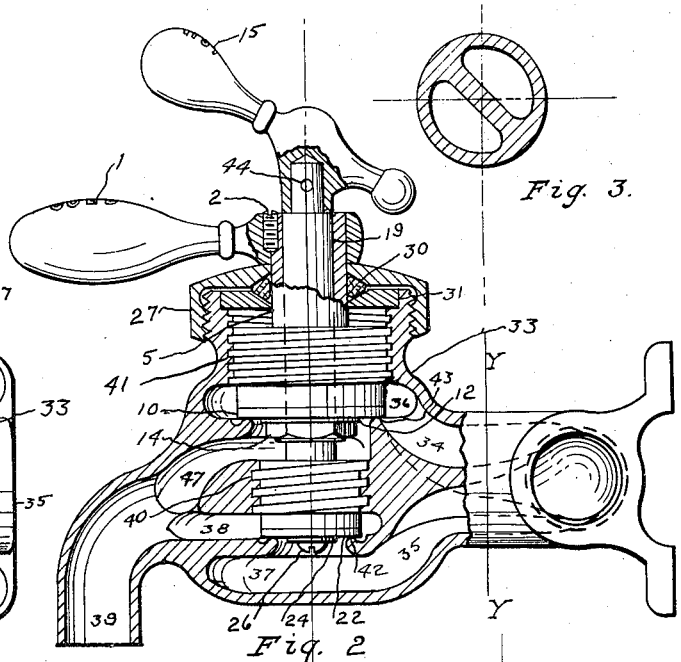
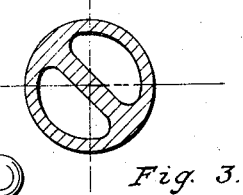
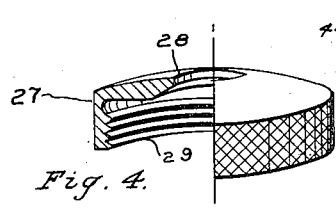
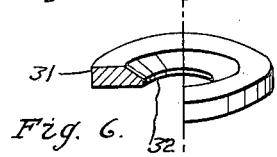
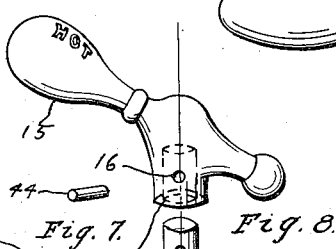
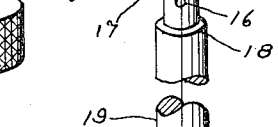
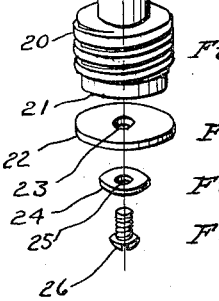
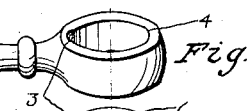
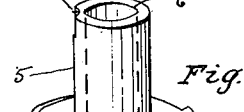
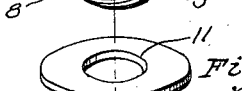
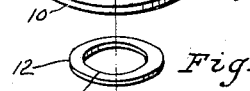
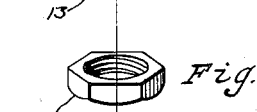
INVENTOR
Eino E. Lakso.

Sept. 9, 1924.  1,508,021
E. E. LAKSO
DOUBLE FAUCET
Filed Jan. 2, 1923   2 Sheets-Sheet 2
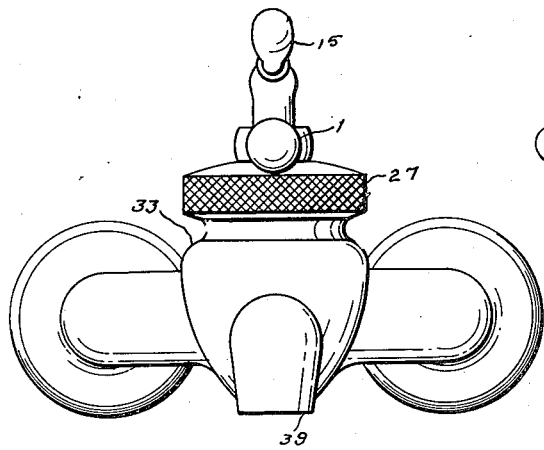
Fig. 19.
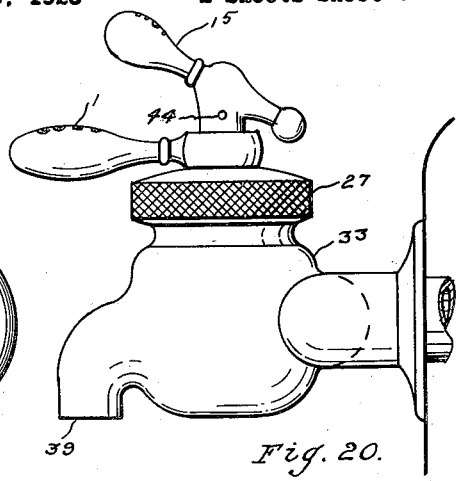
Fig. 20.
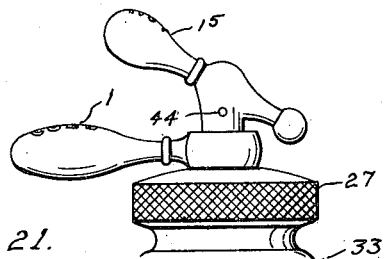
Fig. 21.
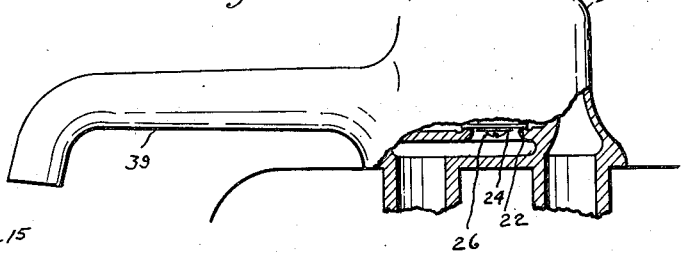
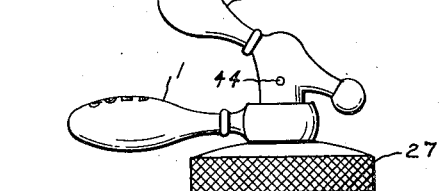
Fig. 22.
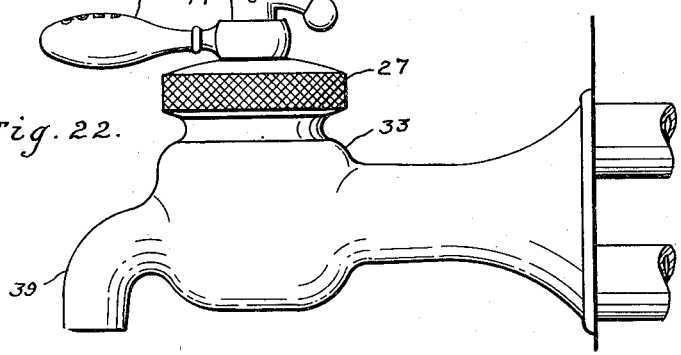
Witnesses:
INVENTOR
Emo E. Lakso
HIS ATTORNEY Patented Sept. 9, 1924.

1,508,021

UNITED STATES PATENT OFFICE.

EINO E. LAKSO, OF FITCHBURG, MASSACHUSETTS.

DOUBLE FAUCET.

Application filed January 2, 1923. Serial No. 610,206.

*To all whom it may concern:*

Be it known that I, EINO E. LAKSO, a citizen of the United States, residing at Fitchburg, in the county of Worcester and State of Massachusetts, have invented certain new and useful Improvements in a Double Faucet, of which the following is a specification.

My invention relates to improvements in a double faucet.

One object is to provide a double faucet with both valves in the same body, on the same axis.

Another object is to provide a double faucet by which the temperature or mixture of a liquid may be controlled without changing the hand from one handle to the other, as in the double faucet now in use. Also to provide one faucet where heretofore two were required.

Another object being to get any temperature of water in any amount from a drip to a full flow.

Still another object being to provide a body of a one piece casting.

Additional objects and advantages will appear hereinafter as the description progresses in relation to the accompanying drawings of one preferred embodiment.

In said drawings:—

Figure 1 is a front elevation.

Figure 2 is a cross-sectional side elevation on the line X—X of Figure 1.

Figure 3 is a cross-section on the line Y—Y of Figure 2.

Figures 4 to 18 are detail views of the several parts of the construction.

Figures 19 to 22 are views of the combination showing application to various piping arrangements which will be specifically described in connection with each figure, Figure 19 being a front elevation of Figure 20.

Referring specifically to the drawings wherein like reference characters designate like or corresponding parts, one form of the invention is illustrated in Figures 1 and 2, Figure 1 being a front elevation of the complete faucet, Figure 2 being a cross-sectional side view of the complete faucet cut on the line X—X of Figure 1.

In Figure 2, 33 is the body, a metallic casting as usual having an interior construction as shown, in which 34 and 35 are inlet passages which at their beginning are on the same horizontal plane, but in connecting to recesses 36 and 37 in the body, they form a quarter-turn spiral as shown in Figure 3.

Said recesses are connected to their respective outlets 47 and 38 by openings through the upper and lower valve seats, said outlets forming into a single spout 39.

Figure 7 to 12 illustrate the construction of the lower valve, of which 15 is the controlling handle, having the desired lettering as shown, it is joined to the stem 19 by means of the hole 17, which receives the smaller diameter of the valve stem, abutting at the shoulder 18, and secured by means of the pin 44 in the hole 16—16. On the large lower end of the valve and against the face 21, is disposed concentrically the leather valve disk 22 and washer 24, and secured by screw 26 passing through the holes 25 and 23 in the washer and disk into the valve. Completely assembled it is screwed into the threaded hole 40, Figure 2, by means of the threaded portion 20, so as to abut the disk 22 to the valve seat 42.

Figures 13 to 18 illustrate the construction of the upper valve, of which 1 is the controlling handle, having the desired lettering as shown, and having the hole 4 to receive the end of the valve stem 5, the upper surfaces forming a plane. In assembling a hole 3—3 is drilled and threaded to receive screw 2 which acts as a locking key, its center being on the circumference of the hole 4. On the large lower end and against the face 8 is disposed the leather valve disk 10 which has a hole 11 to pass over the threaded portion 9, said disk being secured by washer 12 having the hole 13, and nut 14. This valve having a larger seat and outlet has a proportionately smaller pitch thread 7 which screws into the threaded hole 41, Figure 2, the leather disk 10 abutting the valve seat 43, the lower valve stem 19 passing through the hole 6 in the valve stem 5.

Figures 4 to 6 illustrate the stuffing-box of which the gland 31 having the hole 32 is placed as shown in Figure 2, the body being bored to a larger diameter to form a shoulder. The leather or twine packing is forced inward by pressure of the countersunk holes 32 and 28 in the gland and cap, said cap 27 having the internal thread 29.

It will be realized that a faucet devised in this manner may be used in a great many different ways, and put to various uses. Figures 19 to 22 will now be specifically referred to.

Figure 19 is a front elevation and Figure 20 a side elevation of the combination as embodies in a bath-tub faucet.

Figure 21 is a side elevation of the combination as embodied in a basin faucet.

Figure 22 is a side elevation of the combination as applied to a sink basin having a back.

Merely preferred embodiments of the invention have been illustrated and described, it is understood that changes may be resorted to within the spirit and scope as defined in the appended claims.

I am aware that prior to my invention double faucets have been made with two independent valves and one spout. I therefore do not claim such a combination broadly: but,

I claim:

1. In a combination hot and cold water faucet having separate valves, an outlet and separate inlets; means for elevating said valves independently or in combination, said means being two screw section stems concentrically disposed, one passing longitudnally through the other and assumng upper and lower independent positions in the body, said valves actuated by upper and lower handles affixed to aforesaid respective valves.

2. In a combination hot and cold water faucet having separate valves, an outlet and separate inlets in the body; said body being cast in one piece having two distinct valve elevating threaded holes concentrically bored on different planes.

In testimony whereof I have affixed my signature in the presence of two witnesses.

EINO E. LAKSO

Witnesses:
 URHO E. HEISSON,
 WAINO H. LAKSO.